Jan. 13, 1970     W. L. BLACKBURN     3,489,467
ROLLER BUTTON
Filed June 5, 1968     2 Sheets-Sheet 1
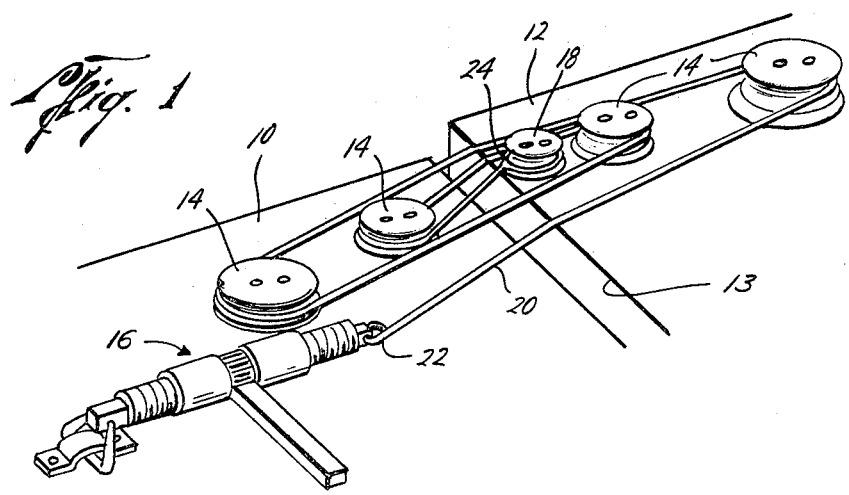
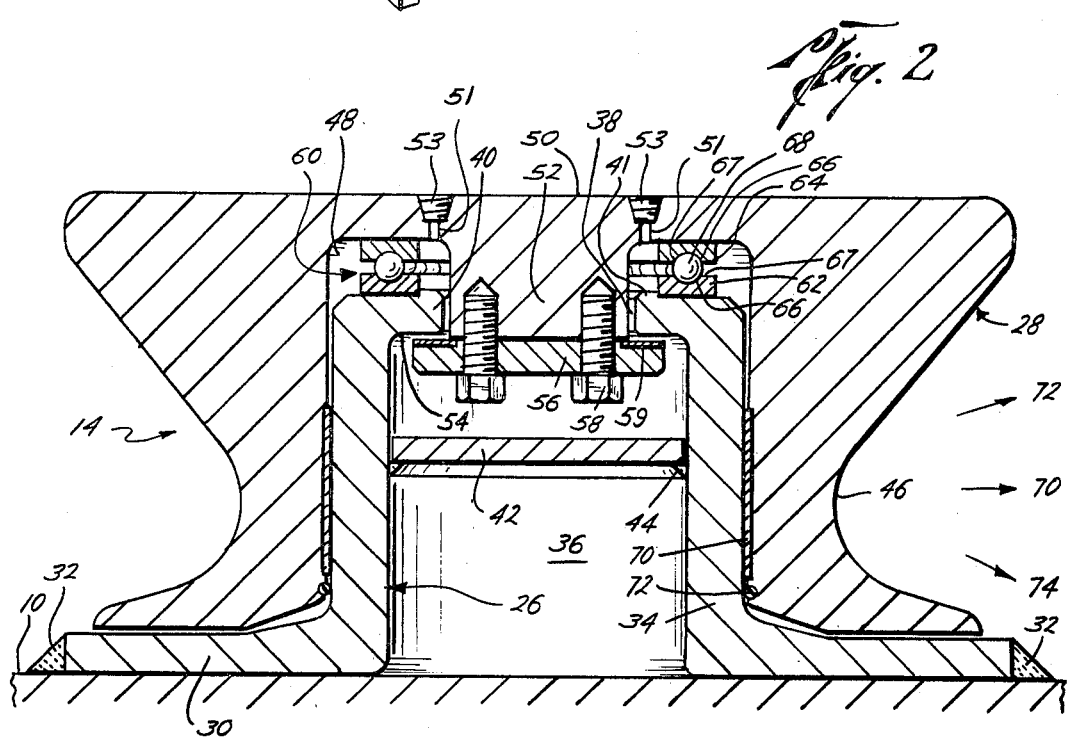
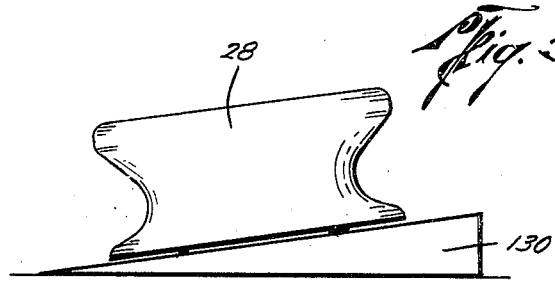
Walter L. Blackburn
INVENTOR.
BY *James F. Wester*
*Paul L. DeVerter II*
*Dudley R. Dobie, Jr.*
*Henry W. Hope*
ATTORNEYS Jan. 13, 1970 W. L. BLACKBURN 3,489,467
ROLLER BUTTON
Filed June 5, 1968 2 Sheets-Sheet 2
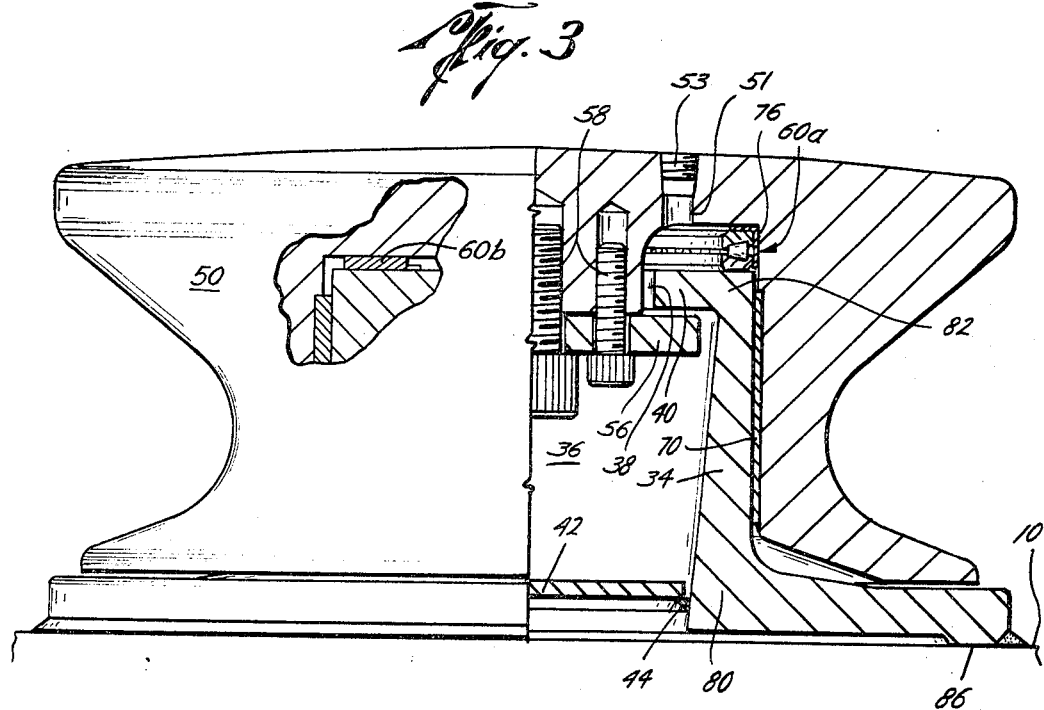
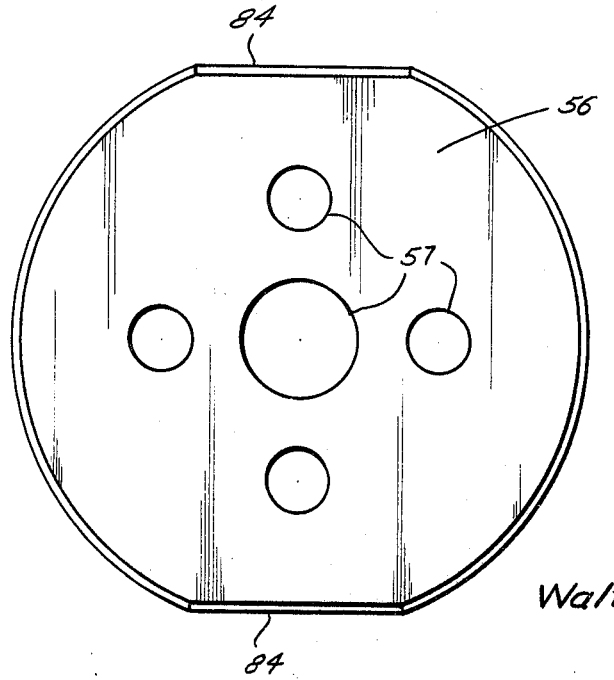
Walter L. Blackburn
INVENTOR.
BY
ATTORNEYS

United States Patent Office 3,489,467
Patented Jan. 13, 1970

3,489,467
ROLLER BUTTON
Walter L. Blackburn, P.O. Box 14628,
Houston, Tex. 77021
Filed June 5, 1968, Ser. No. 734,813
Int. Cl. F16c 13/00, 35/00, 19/54
U.S. Cl. 308—18     15 Claims

ABSTRACT OF THE DISCLOSURE

The present invention utilizes a generally upright spindle or journal attached to the deck of a barge or boat with a pulley rotatably mounted thereon. Roller thrust bearings are used on the top of the spindle to support the pulley in a free wheeling manner and to carry downwardly directed forces. Cylindrical bearing surfaces are used between the spindle and pulley to handle horizontal forces exerted on the button. A flange-plate retainer assembly is employed to prevent removal of the pulley from the spindle, and a lubricant reservoir is provided by the pulley completely enclosing the spindle. Means are utilized to prevent water from contacting the moving parts and surfaces and to prevent the lubricant from escaping.

BACKGROUND OF THE INVENTION

The present invention relates to an improved roller button which includes bearings and retainer means for ease of operation, and which is particularly suited for attachment to the deck of a barge or the like as a deck fitting for rigging purposes.

Prior devices of this general nature, which are variously referred to as chocks, cheek blocks, bitts, bollards, mooring posts or spools, have been suggested which utilize spindles and pulleys about which wire rope or cable (hereinafter referred to as cable) is passed when rigging together and guiding the movement of barges or other vessels. These prior art type devices have generally consisted of a rod-like spindle which is welded to the deck, and about which is rotatably mounted a pulley or grooved wheel. Due to their manner of construction, however, these prior devices have not been utilized when tying trains or barges together, but rather for tying to docks. The reason for this is that they are inherently incapable of withstanding the tremendous strain placed thereon when navigating the barges.

The rolling chock, however, has been so utilized and is capable of handling the strain involved because, not only is the bottom of the spindle attached to the deck, but also the top of the spindle by an appropriate overlying arm. The very presence of this arm, however, limits the potential of the rolling chock, for to utilize the cable in all directions, it is necessary to manually feed the cable between the arm and the pulley. This, of course, considerably increases the time required to make an appropriate connection.

Further, all of the prior devices have suffered from the distinct disadvantage of not being water tight. Consequently, when a wave passes over the chock, water penetrates to the spindle, causing rust, which in turn freezes the rotating pulley, and renders the chock no more effective than a simple post welded to the deck.

In view of these factors, present vessels utilize a non-rotatable button which is welded or bolted to the deck, since this button can be made quite strong and is usable in any direction. Further, having no moving parts, there is nothing to freeze. To utilize these buttons, cables are wrapped thereabout and tightened by an appropriate winch or steamboat ratchet. After the slack is removed from the cable, however, considerable friction develops between the button and the cable. Therefore, time and energy are wasted in attempting to tighten the cable further, which additional tightening is necessary to properly connect the barge.

One improved type of rotatable deck button which overcomes many of the above disadvantages is disclosed in my U.S. Patent No. 3,285,572, issued Nov. 15, 1966 and entitled Deck Button. Buttons such as these, although suitable for the normal heavy loads required to be carried by such deck fittings, are not capable of carrying the large shock loads exerted occasionally or the tremendous loads produced by the "jumbo" barges used on today's inland waterways.

SUMMARY OF THE INVENTION

The button of the present invention overcomes the above noted disadvantages by the utilization of a generally upright journal or spindle having a base adapted to be secured to the deck of a barge. Thrust bearings are positioned at the top of the spindle to carry the pulley in a rotatable manner. Cylindrical bushings or bearing surfaces are positioned within the pulley and form a sliding contact with the upright sidewalls of the spindle. These side bearing surfaces carry the horizontal forces exerted on the roller button. Accordingly, the thrust bearings at the top of the spindle which support the pulley in a free wheeling manner carry only the downwardly directed portion of any force exerted on the button. As will be understood, therefore, these thrust bearings, which are normally ball or roller bearings, carry none of the large horizontal forces exerted on these roller buttons, and accordingly, will not become deformed or the races for the ball or roller bearings become pitted or moved out of alignment.

To prevent unauthorized removal of the pulley from the spindle, a passageway extends from the base to the top of the spindle. An inwardly extending annular flange in the passageway forms a restricted opening near the top of the spindle, through which opening a depending portion of the pulley extends. A plate larger than the restricted opening is then attached to this depending portion. Access to attach this plate is provided through the passageway from the base of the spindle. Since the top of the pulley is a continuous and complete top, once the button is welded to the deck surface, no one can get to the previously mentioned plate to release it from the pulley. Accordingly, the button is made theft and tamper proof.

Further, the continuous top portion of the pulley enclosing the spindle provides an enclosed reservoir for a suitable lubricant and also creates an air pocket. This air pocket will prevent the entrance of water into the working parts of the rotatable deck button, even should the button be completely submerged, thus inhibiting the rusting and freezing of these parts. If desired, a suitable seal may be positioned between the spindle and pulley to insure against the entrance of water should the button become tilted for any reason, whereby the trapped air will be released.

It is, therefore, an object of the present invention to provide an improved roller button for use on the decks of barges, boats and the like.

Another object of the present invention is to provide such a roller button that is theft and tamper proof and yet which provides reliable and long lasting operation.

Still another object of the present invention is to provide such a deck button that is capable of bearing extremely heavy loads and still be easily rotatable.

Yet another object of the present invention is to provide a rotatable deck button that is self-lubricating and that is so constructed that it will not only retain its lubricant but will keep water out of its working parts, even should the button become submerged.

A still further object of the present invention is to provide such a rotatable deck button that is simple to manufacture and install, yet which gives dependable and long lasting service.

Other and further objects, features and advantages will be apparent from the following description of a present preferred embodiment of the invention, given for the purpose of disclosure, taken in conjunction with the accompanying drawings.

BRIEF DESCRIPTION OF THE DRAWINGS

In the attached drawings, like character references designate like parts throughout the several views, which views are as follows:

FIGURE 1 is a perspective view showing a series of deck buttons as they may be used in making up a barge train, FIGURE 2 is an elevation view, in section, showing one embodiment of the deck button of the present invention, FIGURE 3 is an elevation view partially in section, of two different embodiments of the present invention, FIGURE 4 is a plan view of a retainer plate that may be used with the embodiment of FIGURE 4, and FIGURE 5 is an elevation view of still another embodiment of the deck button of the present invention.

BRIEF DESCRIPTION OF THE PREFERRED EMBODIMENTS

Referring now to the FIGURE 1, a typical barge makeup will be described. The corners of two barges 10 and 12 are shown with typical deck fittings. Located on barge 10 are two deck buttons 14 and a ratchet 16, and positioned at the corner of barge 12 are two deck buttons 14 and a third deck button indicated by the numeral 18. The cable 20 is secured to the ratchet winch 16 by means of a loop which is formed in that particular end of the cable, as by splicing. The cable is then wrapped about the deck buttons 14 in the manner shown in FIGURE 1. A second loop 24 has been formed in the opposite end of the cable 20 and is passed about the deck button indicated by the numeral 18. After the loop 24 is secured, the slack in the cable is taken up by means of the ratchet 16. As will be readily understood, this will draw the barges tightly together and hold them securely. As will also be understood, when the slack is taken out of the cable, it is still necessary for the cable to move about the deck buttons 14 somewhat. Due to the tremendous pull that is sometimes exerted on the cable, the friction created between the cable and the deck buttons can become extremely large. This results in increased effort required to tighten the cable to the degree of tension desired. By making provision for the deck buttons to rotate, however, this friction is practically eliminated.

Turning now to FIGURE 2, the deck button which is the subject of the present invention is shown in greater detail. The deck button is comprised essentially of two parts, the spindle 26 and the pulley 28. The spindle has a radially extending base flange 30 which may be welded to the deck of a barge 10, as at 32. Upstanding from the base 30 is a shaft portion 34 about which the pulley will be mounted. This shaft 34 has a passageway 36 which extends from the base through the top of the shaft. A restricted opening 38 is formed at the top of the shaft by means of the annular, inwardly extending flange 40. An upstanding annular rib 41 is located near the inner edge of the flange 40. A plate 42 may be positioned within the passageway by any suitable means, as for example, by the weld 44.

Turning now to the pulley 28, the pulley has a peripheral groove 46 to receive the cable. A recess 48 is located in the pulley extending upwardly from its base. The pulley has a substantially smooth and continuous top 50. A portion 52 extends from the top 50 and into the restricted opening 38. In the preferred embodiment of this invention, this portion 52 extends through the opening 38 and beyond the lowermost edge 54 of the flange 40 a predetermined distance. A retaining plate 56 is attached to the portion 52 by means of bolts 58. If desired, a thrust washer 59 may be located in the retaining plate 56.

Access ports or openings 51 extend through the top of the pulley 28, and thereby provide means for communication with the interior of the button after it is assembled and attached to a deck. The upper portions of these access ports 51 are threaded to receive closure means such as plugs 53.

To support the pulley on the spindle, thrust bearings, generally indicated by the numeral 60 are utilized. This bearing assembly may be any standard high load, low r.p.m. ball or roller thrust bearing, and generally includes mating lower and upper recess 62 and 64 respectively, with grooves 66. A typical ball bearing assembly 60 is shown in FIGURE 2 and a typical roller assembly 60a is shown in FIGURE 3. Since the embodiment presently being discussed is that of FIGURE 2, the comments will be directed primarily to ball thrust bearings but are to be understood to also be generally applicable to roller thrust bearings.

A cylindrical bushing 70 is secured in the sidewall of the recess 48 and is machined to provide a rather close fit with the sidewalls of the upstanding portion 34 of the spindle 26. In one preferred embodiment, the clearance between the bushing 70 and the sidewalls of the spindle is .020 inch on the diameter. The clearance between the rib 41 and the bearing assembly 60 should, in any event, be substantially greater than the clearance between the bushing 70 and the upright portion 34 of the spindle for reasons to be given below. If desired, a sealing member, such as O-ring 72, may be positioned between the sidewalls of the recess 48 and spindle 26 to form a fluid tight seal between the moving members of the button and the exterior of the button.

To assemble the roller button, it is necessary that the pulley be attached to the spindle prior to the spindle being welded to the deck since the attaching bolts 58 can only be reached from the lower part of the passageway 36. The ball thrust bearing assembly 60 is placed on the top of the spindle as shown and the pulley is then placed about the upright portion 34 of the spindle 36. By reaching through the passageway from the base of the spindle, the plate 56 may be positioned and secured. After this, the second plate 42 may then be welded into the passageway 36, if desired.

Although the thrust bearing assemblies will operate without being lubricated, lubricant is needed occasionally to prevent the formation of rust due to the salt atmosphere sometimes present. Access is provided by the ports 51 for this purpose. Lubricant will flow through the annulus formed between the flange 40 and member 52, and through the space existing between the retaining plate 56 and lower surface 54 of the flange 40. The plate 42 serves as a bottom to the lubricant reservoir, although it is not necessary since the passageway 36 could be filled completely. Use of this plate decreases the lubricant needed, however, and offers the further advantage of allowing lubricant to be added prior to shipment of the button from the manufacturing plant.

When lubricant is initially added or is later supplemented, enough must be added to allow lubricant to overflow the lower race 62 so that the surface of and around bushing 70 will be lubricated. This will prevent the formation of rust in these areas where it is most likely to occur. Use of O-ring 72 seals the inner parts of the button from the rust forming elements, and when it is used, this additional lubricant is not needed.

As will readily be understood, lubricant should remain within the button permanently. Since the pulley 28 forms a complete cap around the spindle, an air pocket is formed which will not escape unless the button should be tilted on its side for some reason. This air pocket will prevent any water or other liquid from entering and contacting the working parts of the button. This is true, even should the entire button be submerged, which often happens due to waves washing over the deck. Thus, a long life free from rust and loss of lubrication in the critical operating areas is assured by means of the construction of the present deck button. For additional insurance against moisture entering the operating area of the deck button, a seal 72 may be placed between the pulley and spindle.

Discussing now the increased capacity to carry larger loads, it will be noted that a pull on the button in a horizontal direction, as along arrow 70 will be carried by contact between the bushing 70 and the sidewalls 34 of the spindle 26. The groove 46 should be centered with the bushing 70 for the best results. By proper selection and machining of materials, the spindle and pulley portion can be made to possess the necessary strength. The problem in the past has existed by use of roller or ball bearings in the critical load bearing areas. The bearings were needed to provide the ease of rotation desired, but at the same time, were unsuitable for carrying extremely large loads. Use of the arrangement disclosed herein, however, allows the manufacture of deck buttons having unlimited capacity as to the shock loads and steady pulls that they can handle, depending on the selection of materials, size of the button and method of manufacturing the button.

Should a pull be exerted against the button 14 in an upward direction, as for example, along arrow 72, the horizontal portion of the force will, once again, be carried by the bushing 70 and the spindle 26. The vertical part of the force will be carried by the retainer plate 56 and the flange 40, and of course, no compression forces would be exerted against the bearing assembly 60 by an upward pull.

As has been previously pointed out, the tolerances between the bearing assembly 60 and the flange 41 and between the bushing 70 and spindle 34 should be such as to insure that the bushing 70 contacts the spindle to take up any horizontal force placed on the pulley before any shearing force is exerted between the races 66 and the ball bearings 68. Any substantial shearing force exerted in this manner could result either in a flattening of the ball bearings 68 or a pitting of the races 66. Either would, of course, prevent the smooth operation of the roller button. These problems do not occur, however, since the bearing assembly 60 will slide freely on top of the spindle, limited only by the flange 41, or in the alternative, the pulley will slide over the top of the bearing assembly. The only horizontal forces exerted on the bearing assembly would be small and insignificant forces resulting from the friction created by the sliding of the various parts relative to each other.

In addition to carrying upward pulls on the pulley 28, the plate 56 will also prevent theft of the pulley from the deck button. Since it may be necessary for the plate 56 to rotate while under such an upward pull, suitable bearing surfaces may be located on both the plate 56 and the flange surface 54, such as a flat run washer 59.

It is only a downward force that is carried by the ball thrust bearing assembly 60, as for example, a force in the direction of arrow 74. Once again, however, the horizontal component will be carried by contact between the bushing 70 and the spindle. It is, of course, this component which will make up most of any force exerted against the button. This is especially true when considering the fact that any downward force exerted on the button will be limited by the edge of the barge, boat or the like. In FIGURE 1, for example, barge 12 is higher than barge 10, and accordingly, a downward force is exerted on the buttons 14 and 18 of the barge 12. Since the downward direction of the cable is, however, limited by the edge 13 of the barge 12 only a small downward vertical component of force can be placed on these buttons.

Such a downward pull could, nevertheless, be carried by the thrust bearing assembly. This is due to the fact that the vertical component will result in a force being exerted on a substantial portion of the surface of the ball bearings 68 and the races 66. By contrast, a shear or horizontal force exerted on the ball bearings would bring about substantially a point contact between the edges 67 of the races and the ball bearings. It is this edge contact that will cut into the ball bearings or else will push this edge or lip 67 up, thus deforming the race itself. As pointed out previously, the sliding of the bearing assembly and the maintained tolerances will insure against this.

It should also be understood that use of the ball bearing assembly 60 is not essential. A flat run washer could be substituted for the assembly 60, to give a pulley that will rotate in a relatively effortless manner. Due to the enclosed construction of the present invention, the washer should remain free of water and rust, thus providing a long and maintenance free life. Use of such a washer would also eliminate the need for lubricant.

As has been previously pointed out, another suitable alternative to the ball bearing assembly is the use of a roller bearing assembly 60a which is shown in FIGURE 3. This roller assembly 60a is a standard high load, low r.p.m. Timken roller thrust bearing and the dimension of the pulley recess is sized for a very close clearance between the inside wall of the pulley and the bearing assembly 60a. The operation of this assembly is essentially the same as with the roller thrust bearing assembly of the embodiment shown in FIGURE 2. No shoulder 41 is found on the embodiment of FIGURE 3, however, the positioning of the bearing assembly 60a being achieved due to the substantial identity of its outside diameter of the pulley. Thus, as the pulley shifts from side to side, the bearing assembly will also shift due to contact by the L-shaped retainer plate 76 and the wall of the pulley recess. This method of positioning the bearing assemblies is actually preferred over the upright flange 41 positioned inside the circular bearing assembly. Once again, care must be taken to insure that the clearance between the bushing 70 and the upright portion 34 of the spindle and between the side wall of the pulley recess and the retainer plate 76 are such that any horizontal force will be taken up by the bushing 70 before it can bear as a shear force on the thrust bearing assembly. In this regard, the bearing assembly is freely moveable on top of the spindle so that it may slide with any lateral movement of the pulley 50.

Other changes in this embodiment should be noted. For example, the base portion 80 of the spindle is substantially larger in thickness than is the upper part 82 of the upright spindle portion 34. This design takes into consideration the fact that the largest forces will be exerted on the lower part of the spindle, and thus the most strength is needed there. By the increased thickness at the portion 80, such additional strength may be provided.

Because of this increased thickness at the bottom of the spindle, however, the spindle recess 36 has a larger diameter at its top or upper portion than it does at the opening in the bottom of the spindle base. For this reason, the plates 42 and 56 used with this embodiment must be of a special design such as that shown in FIGURE 4.

Two opposed flat surfaces 84 are located on opposite edges of the plate 56 shown in FIGURE 4. These decrease the dimension of the plate 56 sufficiently so that it may be inserted through the somewhat restricted opening of the recess in the base of the spindle. The flat portions 84 in plate 42 may be made smaller due to the fact that the diameter of the plate 42 is closer to the diameter of the restricted opening for the recess.

A flange 86 is located on the base of the spindle, thus providing a smaller surface to be machined for the leveling of the spindle. The remaining features of the spindle are the same as in FIGURE 2, with the exception of the arrangement of the bolts 58. Any satisfactory number and arrangement of bolts may be used, but at least two bolts should be used to prevent rotation of the pulley 50 relative to the plate 56, such relative rotation possibly resulting in the disconnection of the plate from the pulley. In addition, the O-ring seal 72 may also be utilized on the embodiment of FIGURE 3 by a slight modification of the interior of the pulley below the bushing.

The left hand section of FIGURE 3 shows a modification where a flat run washer 60b is used instead of a roller assembly 60a.

Turning now to FIGURE 5, a modification of the present invention is shown which is designed to alleviate some of the upward thrust where it is expected that a substantial upward component in the force will be experienced. The major portions of the button may be either as shown in FIGURES 2 or 3, as is the case with the moving portions within the assembled button. The only major change is in the base of the spindle. In the embodiment of FIGURE 5, a new base 130 has been added which is inclined. If desired, a separate wedge may be employed to achieve the inclination of the button, thereby eliminating the need for the special base 130. A substantial part of the upward component of any upward pull will be compensated for by the upward inclination of the deck button. It is understood, of course, that the higher edge of the base 130 should be closest to the edge of the barge from which such upward pull will be received. Since the downward pull is limited in any event due to the edge of the barge, the upward inclination of the base 130 will not increase the vertical component of any downwardly directed force by any critical degree.

As can be seen, therefore, the present invention achieves the objectives stated at the outset. An improved button has been disclosed which provides for ease of rotation of the pulley about the spindle portion yet which possesses substantial strength and which may be designed to carry the extremely large loads required by today's barging industry. A permanently lubricated and sealed button has been devised which will both retain its lubricant and prevent water from entering the working parts, even when completely submerged. Furthermore, the deck button presents a completely enclosed unit having no accessible means of removal, other than cutting it from the deck of the barge with a cutting torch. Thus, it possesses a theft-and-tamper-proof nature not normally found in such deck fittings. A deck button has been provided which achieves all of the above mentioned results and yet is quite simple to manufacture, assemble and install and which provides for long and dependable service.

The present invention, therefore, is well adapted to carry out the objects and obtain the ends and advantages mentioned as well as other inherent therein.

What is claimed is:
1. A rotatable button-type deck fitting comprised of:
an upstanding journal having a base for attachment to a deck surface, upstanding sidewalls and a top surface,
a passageway extending through the journal from the base to the top thereof,
an inwardly extending annular flange on said journal defining a restricted opening in the passageway,
a pulley having a substantially smooth top mounted on said journal,
a retainer plate in said passageway on the opposite side of the annular flange from the top of the pulley, said retainer plate being of a larger size than the restricted opening,
means extending through the restricted opening for connecting the plate to the pulley,
bearing means between the top surface of the journal and the pulley for sliding contact with the pulley.
2. The invention of claim 1 wherein the connecting means for the retainer plate to the pulley is accessible only from the side of the annular flange on which the retainer plate is positioned.
3. The invention of claim 2 wherein the bearing means is defined as a flat run washer attached to one of said journal top and said pulley for contact with the other of said journal top and pulley.
4. The invention of claim 1 wherein said bearing means between the top surface of the journal and the pulley is further defined as a thrust bearing assembly positioned between the top surface of the journal and the pulley, but not secured to either said top surface or said pulley.
5. The invention of claim 4 wherein the means connecting the retainer plate to the pulley is accessible only through the passageway from the side of the annular flange on which the retainer plate is positioned.
6. The invention of claim 5 and including:
an annular bushing in the pulley for sliding contact with the sidewalls of the journal, and
a second plate secured to the passageway in a fluid-tight manner, said retainer plate lying between said second plate and annular flange.
7. The invention of claim 6 and including:
at least one access port communicating with said passageway,
a plug releasably secured within said access port, and
means for providing communication by said access port to both sides of said restricted opening.
8. The invention of claim 7 including:
a portion depending from the top of the pulley,
said connecting means being defined as bolts connecting the plate to said depending portion.
9. A rotatable button-type deck fitting comprised of:
a generally upright journal having a base adapted to be attached to a surface,
a passageway extending from the base to the top of the journal,
an inwardly extending annular flange defining a restricted opening for the passageway near the top of the journal,
a pulley having an exterior peripheral cable groove, a substantially continuous top and an axially extending recess, the pulley being rotatably mounted on the journal, the journal extending into said recess,
a cylindrical bushing in said recess bearing against the sidewalls of the journal,
a portion depending from the top of the pulley and being aligned with the restricted opening,
annular bearing means between the top of the journal and the top of the recess, whereby the pulley is supported by the journal and is rotatable about the journal on said bearing means,
a retainer plate in said passageway and on the side of said restricted opening opposite the top of the pulley, said retainer plate being larger than the restricted opening, and
means connecting the plate to said depending portion, said connecting means being accessible only from the part of the passageway on the same side of the restricted opening as is the plate.
10. The invention of claim 9 wherein the annular bearing means is defined as a flat run washer mounted on one of said journal top and recess top to contact the other of said journal top and recess top.
11. The invention of claim 10 being further comprised of:
at least one access port extending into the recess and being in fluid communication with the journal passageway for the addition of lubricant thereto, and
a plug releasably secured in said access port.
12. The invention of claim 11 and being further comprised of a second plate in sealing engagement with the journal passageway, said second plate being positioned on the side of the retainer plate opposite the annular flange.

13. The invention of claim 12 wherein:
the depending portion of the pulley extends through the restricted opening a predetermined distance, and
the connecting means are bolts connecting the plate to the depending portion, said plate being spaced from said annular flange by a distance at least as large as said predetermined distance.

14. The invention of claim 13 and including:
second bearing means on the first-mentioned plate and on the annular flange for contact with each other,
a second access port to the pulley recess,
a second plug releasably secured within said second access port, and
annular sealing means in said recess for a fluid-tight peripheral seal with the sidewalls of said journal.

15. A rotatable button-type deck fitting comprised of:
an upright journal having sidewalls, a top, and a radially extending base adapted to be secured to a surface,
a passageway extending through the journal from the base to the top,
an annular flange in said passageway near the top of the journal forming a restricted opening,
a pulley having
a recess extending axially from the bottom of said pulley, said journal being received in said recess whereby the pulley is rotatably mounted on the journal,
a peripheral cable groove in said pulley,
a portion depending from the top of said recess and into said restricted opening,
a retainer plate in said passageway between the base of the journal and said restricted opening, said retainer plate being larger than said restricted opening,
slots connecting the plate to the depending portion, said bolts being accessible only from the portion of the passageway lying between the journal base and the retainer plate,
thrust bearing assembly means between the top of the journal and the top of the pulley recess, whereby the pulley rests on the bearing assembly means,
a cylindrical bushing in said recess for contact with the sidewalls of the journal,
sealing means between the cylindrical bushing and the base for a sliding seal between the pulley and the sidewalls of the journal,
two access ports in the top of the pulley for communication with the passageway for adding lubricant thereto,
a closure plug releasably secured in each access port,
a second plate secured to said passageway in a fluid-tight manner and positioned between the retainer plate and the base, and
a space normally existing between the retainer plate and the annular flange except when an upward force is exerted in the pulley of sufficient magnitude to lift the pulley until the retainer plate contacts the flange.

References Cited

UNITED STATES PATENTS

| | | | |
|---|---|---|---|
| 541,331 | 6/1895 | Mullen | 308—174 |
| 1,424,990 | 8/1922 | Coyle et al. | 254—150 |
| 2,793,740 | 5/1957 | Daudt | 254—150 X |
| 3,288,439 | 11/1966 | Holmes | 254—150 |

FOREIGN PATENTS 1,270,243  7/1961  France.

CARROLL B. DORITY, Jr., Primary Examiner

U.S. Cl. X.R.

254—150; 308—35, 174